June 10, 1930. O. V. KEAN 1,763,360
NONCORRODIBLE REENFORCED PIPE
Filed Jan. 22, 1927
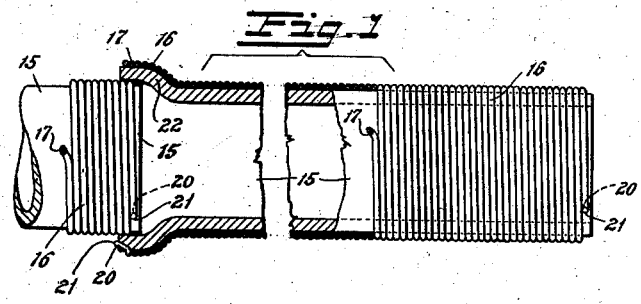
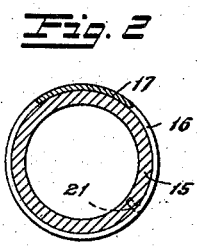
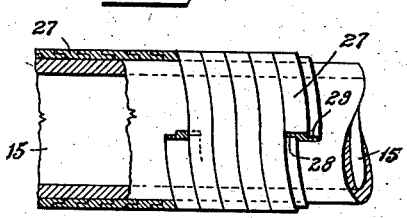
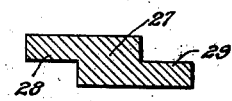
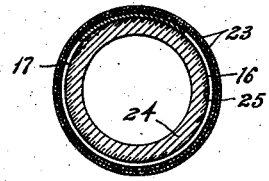
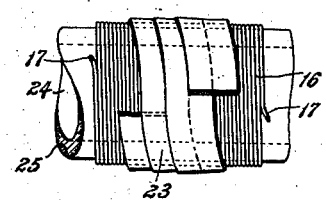
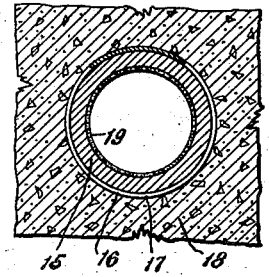
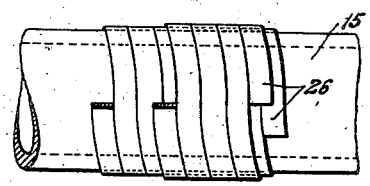
INVENTOR.
Otho V. Kean
BY
ATTORNEYS.

Patented June 10, 1930

1,763,360

UNITED STATES PATENT OFFICE

OTHO V. KEAN, OF PROVIDENCE, RHODE ISLAND

NONCORRODIBLE REENFORCED PIPE

Application filed January 22, 1927. Serial No. 162,756.

This invention relates to improvements in reenforced pipe construction adapted for general application such, for example, as in municipal water distribution systems, in pipe lines for transporting gas or oil, and for like uses. More particularly, in some of its details, the invention relates to improvements in the reenforcement of pipes of metal or other material by means of a reenforcing casing or envelope.

It is a general object of the invention to provide an improved pipe construction which is specially strong, while being light and inexpensive in production costs.

A further object of the invention is to provide an improved pipe of the class mentioned, having high corrosion resisting qualities, while being exceptionally strong so as to adapt it for uses under comparatively high internal pressures heretofore unavailable for the corrosion resisting type of pipe.

A further object of the invention is to provide an improved reenforcement for pipes of cast iron or similar material of high corrosion resisting qualities, so as to adapt the pipe for uses under relatively high internal pressure, and to adapt it for uses where exposed to damage by external agencies tending to crush, bend, or otherwise damage the pipe.

A further object of the invention is to provide an improved reenforced pipe of high corrosion resistivity while limiting to a minimum amount the degree of expansion and contraction under variations of internal pressure.

Still another object is to provide an improved reenforced pipe construction whereby corroding agencies, such as moisture, are effectively excluded from contact with the walls of the pipe.

A further object of the invention is to provide an improved reenforcement for metallic, clay, cement, or other pipes whereby the wall of the pipe is placed under initial compression, and wherein the stresses due to normal service pressures within the pipe are absorbed directly by the reenforcement rather than by the walls of the pipe.

Still another object of the invention is to provide an improved reenforcement for pipes so as to limit the expansion and contraction thereof under service pressures, and thus to minimize the tendency of the pipe to part or separate, either at the outside or inside surfaces thereof, from any protective linings or reenforcing coatings or casings such, for example, as cement or reenforced concrete.

A further object of the invention is to provide an improved reenforcement for chilled pipes so as to minimize the danger of breaking, cracking, or other rupture or damage in such pipes.

Another object is to provide an improved reenforcement for pipes or the like so as to stiffen the pipe longitudinally and increase its resistance to bending stresses.

A further object of the invention is to provide an improved fastening device for securing the ends of reenforcing wires or bands to a pipe or tube which is reenforced by winding the wire or band therearound.

Another object of the invention is to provide an improved reenforcing casing or envelope for pipes or the like, which is made of corrosion resisting material such, for example, as stainless steel or similar non-corrodible metal.

A further object of the invention is to provide a protective wrapping or like covering for pipes, including a fabric such as cloth or burlap impregnated with bakelite varnish or lacquer, so as to effectively exclude corroding agencies from access to the surface of the pipe, or to the outer reenforcing envelope thereof.

Other objects will be in part obvious in connection with the following detailed description of certain illustrated but preferred embodiment of the invention and will be in part pointed out therein.

For a more complete understanding of the nature and objects of the invention, reference is had to the following detailed description of the illustrative embodiment, and to the accompanying drawings, in which Fig. 1 is a side elevation partially in central longitudinal section of a pipe or tube embodying the invention.

Fig. 2 is a transverse section thereof.

Figs. 3, 4, and 5, are enlarged cross sectional views of different forms of wire or band used in the pipe reenforcement.

Fig. 6 is a view similar to Fig. 1, but showing a modified form of the reenforcing envelope or casing.

Fig. 7 is an enlarged cross sectional view of the reenforcing band or strip of Fig. 6.

Figs. 8 and 9 are respectively cross sectional and side elevational views of a further embodiment of the invention.

Fig. 10 is a cross sectional view similar to Figs. 2 and 8, but showing the reenforcing pipe construction embedded in cement or concrete, and Fig. 11 is an elevation showing a further modified form of the reenforcing envelope.

Referring to the drawing for a detailed description of the illustrative embodiments of the invention there shown, and first to the embodiment shown in Figs. 1 and 2, a pipe or tube 15 is provided having imperforate walls. This tube may be made in various lengths, diameters and wall thicknesses, dependent upon the service in which it is to be employed, and it may also be made of different materials. Steel has an advantage in strength, or in lightness for a given strength, but it is disadvantageous from the standpoint of production costs, and it is also more susceptible to influences of rust and corroding agents, in various uses both below and above ground, than are certain other materials such, for example, as cast iron, clay, or cement.

In order to reenforce the tube 15, an enclosing casing or envelope is provided indicated generally at 16. This reenforcing casing is preferably made of a band wrapped around the outside of the pipe in the form of a coil, the ends and intermediate parts of which may be suitably secured to the pipe. This reenforcing coil or envelope preferably extends throughout the longitudinal extent of the pipe, that is, from end to end of the reenforced pipe sections. The reenforcing band may take the form of a wire 17, circular in section, as shown in Figs. 1, 3 and 4, or it may be of other sectional shapes, some of which are illustrated in Figs. 5, 6, 7 and 11.

The reenforcing casing is of a material having considerably greater tensile strength, greater elastic limit under tension, and greater modulus of elasticity under tension, than the same characteristics of the material forming the inner pipe part or tube 15. For many purposes a very advantageous combination for the construction of the composite reenforcing pipe, is where the inner tube part 15 is made of cast iron and the reenforced casing or envelope is made of steel of high tensile strength. Under these conditions advantage is taken of the high resistance to corroding influences of the cast iron, both at the outer and inner surfaces thereof, and of the relatively great strength afforded by the steel reenforcing envelope. By means of this combination it is possible to construct a pipe which is light compared with cast iron construction while having the requisite strength for installation in water distributing systems, pipe lines for transporting oil or gas, and like uses. Moreover, this construction attains such other advantageous results as high resistance to rust and corrosion and decreased manufacturing costs. The high strength with accompanying lightness and low manufacturing costs of this construction is further enhanced and promoted by placing the reenforcing envelope under considerable initial tension over the inner tube 15 so as to place the walls of the latter under high initial compression, as compared with the stress which would be exerted upon said walls by normal internal pipe pressures intended to be carried by the pipe. This feature will now be disclosed.

The band or wire 17 is wound upon the inner tube 15 under considerable tension so as to place the walls of said tube under heavy compression, which may, in certain cases, reach a value approximating 10,000 pounds per square inch, but the degree of compression may vary with the pressure to be carried within the pipe. The initial stress of compression imposed by the reenforcing envelope upon the walls of the inner tube 15 is preferably higher per unit area than the stress per unit area which would be imposed upon the pipe walls by normal internal service pressures carried by the pipe. The effect of this relation is that the tube walls are constantly maintained under compressive stress by the action of the reenforcing envelope during normal service operation of the pipe. The result is that the load of the internal pipe pressure is carried by the reenforcing envelope, which is appropriately designed for this purpose, while the inner tubular part 15 provides the principal part of the requisite pipe rigidity, resistance to external crushing forces and to bending stresses, while also resisting tendency to rust or corrode, as mentioned above.

Due to the great tensile strength of the reenforcing envelope, as compared with that of the material of tube 15, it will be seen that the walls of said tube may be constructed relatively thin. Also by virtue of the higher modulus of elasticity under tension of the reenforcing envelope, as compared with that of the inner tube 15, the radial expansion or contraction of the composite pipe, under variation of internal pressures, will be greatly reduced over values where the pipe is constructed of a material having a lower modulus of elasticity than that of the reenforcing casing. It will be noted that the strip or wire of the reenforcing casing may be of hardened steel of great tensile strength and having high modulus of elasticity. This feature is of great importance in cases where the pipe is embodied in a reenforcing covering such, for example, as the concrete block or bed 18, as shown in Fig. 10. In cases where there is considerable expansion or contraction under variations in pressure, or by virtue of other causes, there is a tendency for the outer surface of the pipe to part or separate from the contacting concrete surface due, probably, to the difference in elasticity of the pipe and concrete. This parting results in a crack or space between the pipe and concrete, permitting access of moisture and other corroding agents tending to hasten pipe rust and corrosion. This tendency is materially reduced by the construction above set forth.

It will be understood that in the embodiment shown in Fig. 10 the concrete or cement embedded pipe is constructed as above described, with the walls of the inner tube 15 under compression imposed by the reenforcing envelope 16. Also, as shown in this figure, a cement lining 19 may be placed on the inner walls of the pipe for protection thereof, and the parting or separation of this lining from the walls of the pipe under influences as suggested above is considerably reduced for reasons mentioned.

The ends of the reenforcing wire may be attached to the tubing 15 by means of a hole 20 drilled into the pipe for the reception of the bent end 21 of the wire. This hole may be positioned in the transverse face of the pipe end, or it may be formed in the outer tubular face of the pipe, extending transversely of the wall thereof. This connection binds the wire and holds it during application of tension when the reenforcing casing is being placed in position, and helps to hold the casing in position after complete application thereof. Also the reenforcing bands of wires may be attached to the outer surface of the tube 15 at various points therealong as by welding or soldering, but preferably by brazing. These brazed attachments may be spaced as desired along the tube, or they may be in a substantially continuous line whereby each convolution of the reenforcing casing is secured to the tube 15.

The pipe is shown with a bell or enlargement 22 for the reception of the end of a companion pipe in connected relation. It will be observed that the reenforcing envelope is continued over this enlargement substantially to the end of the pipe, thus providing a reenforcement for this part of the pipe and protecting it against breakage. This reenforcement is particularly advantageous, since the connections between adjacent pipe sections are frequently subjected to exceptional stresses.

In order to protect the reenforcing envelope from corroding influences, the reenforcing band, whether of circular section or any other sectional form, may be made of corrosion resistant material such, for example, as stainless steel. This corrosion resistant envelope may also be designed for resistance to corrosion as its major function rather than pipe reenforcement: in such cases the tension of the band may be less, its cross-sectional form varied, or its relative strength and sectional area decreased. For still further protecting the pipe from corroding influences, a protective wrapping or coating 23 may be placed over the outer surface of the pipe, whether or not the pipe is wrapped or the corrosion resistant material used. As shown in Figs. 8 and 9, this protective coating is in the form of thoroughly dried burlap or similar fabric, impregnated with bakelite varnish or bakelite laquer composition. This impregnated burlap is preferably in the form of a long strip wound spirally upon the outer surface of the pipe with the adjacent edges of the strips arranged in overlapping relation.

As shown in Figs. 8 and 9, the tensioned reenforcing envelope may be applied to a chilled tube or pipe 24, similar in form to the tube 15, but having an outer zone of the metal wall thereof chilled as indicated at 25, forming an outer hardened annular zone of metal which is normally under tension so as to impose a compressive force upon the inner annular zone of the pipe. This chilled tube may be of cast iron, steel, or other material. When the reenforcing envelope is placed in position upon this chilled pipe a tension is applied sufficient to overcome the initial tension of the chilled zone and place the tube wall under compression throughout its entire thickness. This construction in addition to the advantages already pointed out in the foregoing disclosure, relieves the tube of stresses within the chilled zone, thus decreasing the tendency to crack or break or to fail otherwise. The reenforcing envelope in this and other forms of the invention functions as a cushion to protect the pipe from damage due to external blows or pressure.

In the form of the invention shown in Fig. 11, the reenforcing band is in the form of a flat metallic strip 26 wound in two superposed layers, both of which may be tensioned as above described. The convolutions of the outer layers are arranged to overlap the adjoining edges of the convolutions directly thereunder: in other words, the flattened or rectangular strip forming an outer convolution breaks joints with two underlying convolutions. In this manner, the convolutions of the reenforcing envelope cooperate to stiffen and reenforce the tube against longitudinal bending stresses.

The form of the invention shown in Figs. 6 and 7 utilizes a flattened reenforcing band 27, but in this case the reenforcing band is provided with flanges or formations 28 and 29 at diagonally opposite corners thereof, thus providing a strip substantially Z-shaped in section. This construction provides mating or complementary interengaging formations for the adjacent edges of adjacent convolutions. This strip may be wound under tension as above described, the adjacent edges of the strip inter-engaging or inter-locking so as to substantially reenforce and rigidify the pipe against longitudinal bending stresses.

The reenforcing band for the envelope may be substantially square in section, as indicated at 30 in Fig. 5, and in any sectional form the band may be covered with a protective jacket or layer 31 of corrosion resisting material to protect the band from corrosion agents.

Since certain changes may be made in the above construction and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A cast iron pipe having a chilled outer zone and a tensioned reenforcing winding of steel band therearound.

2. A cast iron pipe having a chilled outer zone and a reenforcing winding of steel band therearound, said reenforcing winding being under such tension as to maintain the walls of the pipe including said chilled outer zone under circumferential compression under normal internal pressure carried by the pipe.

3. In combination, a cast iron pipe having a chilled outer zone, a reenforcing winding of steel band around said pipe and being tensioned to place the pipe walls in circumferential compression and an outer reenforcement of cement or the like in the form of a bed in which the pipe is embedded and which is in contact with the outer surface of the pipe.

4. In combination, a cast iron pipe having a chilled outer zone, a reenforcing winding of steel band therearound, said reenforcing winding being under such tension as to maintain the walls of the pipe under circumferential compression under normal internal pressure carried by the pipe, and an outer reenforcement of cement or the like in contact with the outer surface of the pipe.

5. A cast metal pipe having a chilled outer zone and a reenforcing envelope stressed to place said chilled zone under circumferential compression.

In testimony whereof I affix my signture.

OTHO V. KEAN.